US009916189B2

(12) United States Patent
Pohlack et al.

(10) Patent No.: US 9,916,189 B2
(45) Date of Patent: Mar. 13, 2018

(54) CONCURRENTLY EXECUTING CRITICAL SECTIONS IN PROGRAM CODE IN A PROCESSOR

(71) Applicant: Advanced Micro Devices, Inc., Sunnyvale, CA (US)

(72) Inventors: Martin T. Pohlack, Dresden (DE); Stephan Diestelhorst, Dresden (DE)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 14/479,297

(22) Filed: Sep. 6, 2014

(65) Prior Publication Data
US 2016/0070659 A1     Mar. 10, 2016

(51) Int. Cl.
G06F 9/52       (2006.01)
G06F 12/06      (2006.01)
G06F 9/45       (2006.01)
G06F 12/0855    (2016.01)

(52) U.S. Cl.
CPC ............ *G06F 9/52* (2013.01); *G06F 12/0857* (2013.01); *G06F 8/458* (2013.01); *G06F 2201/825* (2013.01)

(58) Field of Classification Search
CPC ....... G06F 8/458; G06F 2201/825; G06F 9/52
See application file for complete search history.

(56) References Cited

U.S. PATENT DOCUMENTS

| 2002/0078119 A1* | 6/2002 | Brenner ................. G06F 9/526 718/102 |
| 2003/0079094 A1* | 4/2003 | Rajwar ................. G06F 9/3004 711/150 |
| 2004/0034642 A1* | 2/2004 | Szilagyi ................. G06F 9/524 707/100 |
| 2005/0132143 A1* | 6/2005 | Chaney ..................... G06F 9/52 711/145 |
| 2010/0332770 A1* | 12/2010 | Dice ....................... G06F 9/526 711/148 |
| 2012/0096292 A1* | 4/2012 | Mekhiel ................... G06F 1/12 713/322 |
| 2013/0097136 A1* | 4/2013 | Goldberg .......... G06F 17/30289 707/704 |

* cited by examiner

*Primary Examiner* — Ann J Lo
*Assistant Examiner* — Masud Khan
(74) *Attorney, Agent, or Firm* — Park, Vaughan, Fleming & Dowler LLP

(57) ABSTRACT

In the described embodiments, entities in a computing device selectively write specified values to a lock variable in a local cache and one or more lower levels of a memory hierarchy to enable multiple entities to enable the concurrent execution of corresponding critical sections of program code that are protected by a same lock.

22 Claims, 5 Drawing Sheets

CONCURRENTLY EXECUTING CRITICAL SECTIONS IN PROGRAM CODE IN A PROCESSOR

BACKGROUND

Field

The described embodiments relate to computing devices. More specifically, the described embodiments relate to handling critical sections in program code in computing devices.

Related Art

In some computing devices, one or more instructions in program code may be grouped into what is called a "critical section." Generally, critical sections include instructions that are intended to be prevented from being concurrently executed with the instructions in one or more other critical sections (including, in some cases, other instances of a critical section itself). For example, when instructions from a first section of program code are to access memory without the values in the accessed memory locations being changed while the instructions from the first section are executed by instructions from a second, third, etc. section of program code, critical sections may be used to prevent the instructions from the second, third, etc. sections of program code from changing the values. As described, this can include preventing the instructions from the first section from being executed concurrently by two entities (e.g., cores, threads, etc.) in the processor (as two separate instances of the first section).

Each critical section is associated with (or "protected by") a lock that is intended to prevent the instructions in the critical section from being executed concurrently with the instructions in other critical sections that are protected by the same lock. When a given entity in a processor acquires the lock for a corresponding critical section, the given entity is able to freely execute the instructions in the critical section. However, other entities are prevented from simultaneously acquiring the lock and thus are unable to execute any critical section protected by the same lock.

A lock is often acquired by the given entity when the given entity transitions a value of a lock variable for the lock from a first value indicating the lock is free (a FREE value such as 0) to a second value that indicates that the lock has been taken (a TAKEN value such as 1). For example, in some cases, a critical section comprises a lock-acquisition instruction, one or more instructions to be executed, and a lock-release instruction. In existing processors, when executing a critical section, an entity in the processor first executes the lock-acquisition instruction. The lock-acquisition instruction causes the entity to write the TAKEN value to the lock variable. The entity then executes the one or more instructions from the critical section. After executing the one or more instructions from the critical section, the entity executes the lock-release instruction, which causes the entity to release the lock by writing the FREE value to the lock variable.

Using critical sections as described can result in unnecessary restrictions on the execution of program code. For example, an executing entity may execute a critical section that does not perform operations for which the results are externally "accessible" (i.e., accessible by other entities in the processor, such as performing writes to memory locations that are accessible to other entities in the processor, changing processor state that is accessible to other entities in the processor, etc.). In this case, the critical section's effect on the processor is isolated to the entity and preventing other critical sections from executing concurrently with the critical section unnecessarily restricts the execution of program code. Such restrictions can result in sub-optimal performance for the processor.

BRIEF DESCRIPTION OF THE FIGURES

Throughout the figures and the description, like reference numerals refer to the same figure elements.

DETAILED DESCRIPTION

Figure 1:
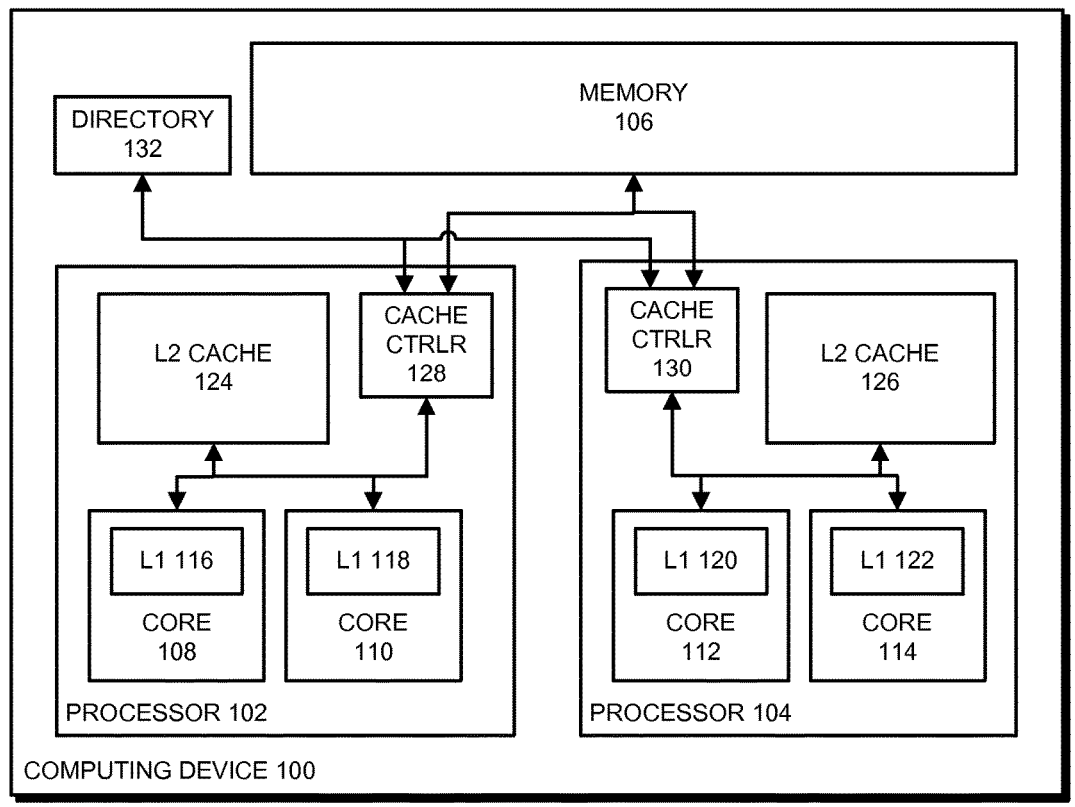
FIG. 1 presents a block diagram illustrating a computing device in accordance with some embodiments.

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

Overview

The described embodiments include a computing device in which entities (cores, threads, etc.) are enabled to concurrently execute critical sections that are protected by the same lock. As described in more detail below, these embodiments are implemented by selectively writing specified values to lock variables to enable the entities to concurrently execute critical sections that are protected by the same lock, while maintaining the appearance that critical sections were not concurrently executed.

In the described embodiments, concurrent execution of critical sections protected by the same lock is implemented by permitting entities in the computing device to hold a copy of a lock variable (i.e., a cache block holding the lock variable) in a local cache with a TAKEN_FOR_READING value, while the lock variable in a lower level cache has a FREE value. When the entities hold the lock variables with the TAKEN_FOR_READING value, the entities assume that (and act as if) they hold the lock. However, because the copy of the lock variable in the lower level cache has the FREE value, the lock appears to be available (or "free") to other entities in the computing device. This enables multiple entities in the computing device to simultaneously hold the lock variable using the TAKEN_FOR_READING value. This in turn enables multiple entities to concurrently execute critical sections protected by the same lock. As long as none of the entities writes a TAKEN value to the lock variable in the lower level cache (which is described in more detail below), all of the entities may complete the concurrent execution of corresponding critical sections.

These embodiments maintain the appearance that the critical sections are not being executed concurrently by preventing any entity that is executing a critical section from performing an operation that is externally accessible while the lock variable is held in the local cache for the entity with the TAKEN_FOR_READING value. Generally, an "externally accessible" operation includes any operation for which a result is accessible to at least one other entity on the computing device that may be concurrently executing a critical section protected by the same lock (e.g., a write to a lower-level cache or memory, a state change, etc.). Before a given entity performs an externally accessible operation, the lock variable in the local cache for the given entity is updated to a TAKEN_FOR_WRITING value. In addition, the given entity writes a TAKEN value to the copy of the lock variable in a lower-level cache. By writing the TAKEN value to the copy of the lock variable in a lower-level cache, the given entity causes other entities to invalidate copies of the cache block (where a cache block is one or more bytes, cache lines, and/or other portions of the cache) for the lock that are held by other entities in corresponding local caches. The invalidation of the cache block by the other entities (and thus the loss of the lock variable in the TAKEN_FOR_READING state) causes the other entities to abort execution of corresponding critical sections. In this way, before the given entity performs an externally accessible operation, the execution of critical sections that are protected by the same lock by other entities is aborted, thereby preserving the appearance that the critical sections were not executed concurrently.

By initially holding copies of the lock variable in local caches for entities with the TAKEN_FOR_READING value, while the copy of the lock variable in the lower-level caches remains in the FREE value, the described embodiments enable multiple entities in the computing device to concurrently execute critical sections protected by the same lock. However, these embodiments protect the appearance that the critical sections are not executed in parallel using the TAKEN_FOR_WRITING and TAKEN values as described above. This is an improvement over existing computing devices that simply write the TAKEN value to the lock variable in the copy of the cache block in the lower-level caches upon commencing the critical section, thereby preventing other entities on the computing device from concurrently executing critical sections protected by the same lock. This improvement enables the computing device to execute program code, and, particularly, critical sections, more efficiently, leading to improved overall performance for the computing device. In addition, in contrast to other lock-elision schemes that keep track of data read in the critical section and/or buffer stores that occur in the critical section, the described embodiments perform less work. This is true because the above-described use of the lock variable by the described embodiments enables the described embodiments to detect conflicts during the execution of the lock section (e.g., via cache coherency mechanisms, etc.) and handle externally accessible operations.

Computing Device

FIG. 1 presents a block diagram illustrating a computing device 100 in accordance with some embodiments. As can be seen in FIG. 1, computing device 100 includes processors 102-104 and memory 106. Processors 102-104 are generally devices that perform computational operations in computing device 100. Processors 102-104 include four processor cores 108-114, each of which comprises a computational mechanism such as a CPU, a GPU, an APU, and/or an embedded processor.

Processors 102-104 also include cache memories (or "caches") that can be used for storing instructions and data that are used by processor cores 108-114 for performing computational operations. The caches in processors 102-104 include a level-one (L1) cache 116-122 (e.g., "L1 116") in each processor core 108-114 that is used for storing instructions and data for use by the corresponding processor core. Generally, L1 caches 116-122 are the smallest of a set of caches in computing device 100 and are located closest to the circuits (e.g., execution units, instruction fetch units, etc.) in the respective processor cores 108-114. The closeness of the L1 caches 116-122 to the corresponding circuits enables the fastest access to the instructions and data stored in the L1 caches 116-122 from among the caches in computing device 100. Processors 102-104 further include level-two (L2) caches 124-126 that are shared by processor cores 108-110 and 112-114, respectively, and hence are used for storing instructions and data for all of the sharing processor cores. Generally, L2 caches 124-126 are larger than L1 caches 116-122 and are located outside, but close to, processor cores 108-114 on the same semiconductor die as processor cores 108-114. Because L2 caches 124-126 are located outside the corresponding processor cores 108-114, but on the same die, access to the instructions and data stored in L2 cache 124-126 is slower than accesses to the L1 caches. Each of the L1 caches 116-122 and L2 caches 124-126, (collectively, "the caches") include memory circuits that are used for storing cached data and instructions. For example, the caches can include one or more of static random access memory (SRAM), embedded dynamic random access memory (eDRAM), DRAM, double data rate synchronous DRAM (DDR SDRAM), and/or other types of memory circuits.

Memory 106 comprises memory circuits that form a "main memory" of computing device 100. Memory 106 is used for storing instructions and data for use by the processor cores 108-114 on processor 102-104. In some embodiments, memory 106 is larger than the caches in computing device 100 and is fabricated from memory circuits such as one or more of DRAM, SRAM, DDR SDRAM, and/or other types of memory circuits.

Taken together, L1 caches 116-122, L2 caches 124-126, and memory 106 form a "memory hierarchy" for computing device 100. Each of the caches and memory 106 are regarded as levels of the memory hierarchy, with the lower levels including the larger caches and memory 106.

In addition to processors 102-104 and memory 106, computing device 100 includes directory 132. In some embodiments, processor cores 108-114 may operate on the same data (e.g., may load and locally modify data from the same locations in memory 106). Computing device 100 generally uses directory 132 and/or another mechanism such as cache controllers 128-130 to avoid different caches (and memory 106) holding copies of data in different states—to keep data in computing device 100 "coherent." Directory 132 is a functional block that includes mechanisms for keeping track of cache blocks/data that are held in the caches, along with the coherency state in which the cache blocks are held in the caches (e.g., using the MESI coherency states modified, exclusive, shared, invalid, and/or other coherency states). In some embodiments, as cache blocks are loaded from memory 106 into one of the caches in computing device 100 and/or as a coherency state of the cache block is changed in a given cache, directory 132 updates a corresponding record to indicate that the data is held by the holding cache, the coherency state in which the cache block is held by the cache, and/or possibly other information about the cache block (e.g., number of sharers, timestamps, etc.). When a processor core or cache subsequently wishes to retrieve data or update the coherency state of a cache block held in a cache, the processor core or cache checks with directory 132 to determine if the data should be loaded from memory 106 or another cache and/or if the coherency state of a cache block can be changed. As described in more detail below, in some embodiments, cache blocks that include lock variables can be loaded to local caches and written in the local caches (e.g., with the TAKEN_FOR_READING value) without updating a coherency state for the cache block in a lower-level cache to reflect the write (e.g., without updating the coherency state in directory 132 to "exclusive" or "modified" for the cache block), which enables other entities in the processor to load the cache block to their corresponding local caches.

As can be seen in FIG. 1, processors 102-104 include cache controllers 128-130 ("cache ctrlr"), respectively. Each cache controller 128-130 is a functional block with mechanisms for handling accesses to memory 106 and communications with directory 132 from the corresponding processor 102-104.

Although an embodiment is described with a particular arrangement of processors and processor cores, some embodiments include a different number and/or arrangement of processors and/or processor cores. For example, some embodiments have two, six, eight, or another number of processor cores—with the cache hierarchy adjusted accordingly. Generally, the described embodiments can use any arrangement of processors and/or processor cores that can perform the operations herein described.

Additionally, although an embodiment is described with a particular arrangement of caches and directory 132, some embodiments include a different number and/or arrangement of caches and/or do not include directory 132. For example, the caches (e.g., L1 caches 116-122, etc.) can be divided into separate instruction and data caches. Additionally, L2 cache 124 may not be shared in the same way as shown, and hence may only be used by a single processor core, two processor cores, etc. (and hence there may be multiple L2 caches 124 in each processor 102-104). As another example, some embodiments include different levels of caches, from only one level of cache to multiple levels of caches, and these caches can be located in processors 102-104 and/or external to processor 102-104. For example, some embodiments include one or more L3 caches (not shown) in the processors or outside the processors that is used for storing data and instructions for the processors. Generally, the described embodiments can use any arrangement of caches that can perform the operations herein described.

In addition, although embodiments are described that hold the lock variable in a local cache, in some embodiments, a different structure (circuit, element, device, functional block, etc.) can hold the lock variable. For example, in some embodiments, a purpose-specific buffer, a memory circuit, a register, and/or another structure can be used alone or in combination with the local cache and/or another structure to hold the lock variable. Generally, the described embodiments include sufficient structures to perform the operations herein described using the lock variable.

Moreover, although computing device 100 and processors 102-104 are simplified for illustrative purposes, in some embodiments, computing device 100 and/or processors 102-104 include additional mechanisms for performing the operations herein described and other operations. For example, computing device 100 and/or processors 102-104 can include power controllers, mass-storage devices such as disk drives or large semiconductor memories (as part of the memory hierarchy), batteries, media processors, input-output mechanisms, communication mechanisms, networking mechanisms, display mechanisms, etc.

Entities

This description uses "entities" in a computing device (e.g., computing device 100) for describing operations. Generally, these entities can comprise any portion of the computing device that can perform some or all of the indicated operations. For example, in some embodiments, entities include one or more processors, cores, threads executed by cores (where threads are software entities that operate on underlying hardware in a core in a processor), cache controllers, directories, pipelines, compute units, etc., with each entity performing a corresponding portion of the operations herein described.

Concurrent Execution of Critical Sections

As described above, a critical section is a section of program code that comprises a lock-acquisition instruction, one or more instructions to be executed, and a lock-release instruction. In the described embodiments, when an entity in a computing device (e.g., computing device 100) executes a lock-acquisition instruction at the beginning of a critical section, the entity initially loads a copy of a cache block that includes a corresponding lock variable (i.e., a lock variable that controls access to the critical section) to a local cache for the entity (e.g., L1 cache 116 when the entity is processor core 108, etc.) and writes a TAKEN_FOR_READING value to the lock variable in the local cache (the entity may also check the value of the lock variable before loading the cache block, as described in more detail below). During this operation, the entity leaves unchanged a FREE value held in the lock variable in a copy of the cache block in lower level caches (e.g., L2 cache 124, etc.). In these embodiments, the TAKEN_FOR_READING value is a numerical, bitwise, etc. value (e.g., 1, A, etc.) that is set so that the entity assumes that the lock is held by the entity and thus the critical section can be freely executed. In addition, the FREE value is a numerical, bitwise, etc. value (e.g., 0, B, etc.) that is set to indicate to entities in the computing device that the lock is free (i.e., is not held by any other entity in the computing device) and thus the lock can be acquired by an entity to enable the execution of the critical section.

After writing the TAKEN_FOR_READING value to the lock variable in the local cache, the entity executes the instructions in the critical section. If the entity is able to execute all of the instructions in the critical section without performing an externally accessible operation, the entity maintains the TAKEN_FOR_READING value in the lock variable in the local cache and maintains the FREE value in the copy of the lock variable held in the lower-level cache for the duration of the execution of the critical section. Externally accessible operations generally include operations for which the results are accessible by one or more other entities in the computing device, such as a write to a lower-level cache or memory, a system state change, and a reconfiguration of some portion of software (variable changes, etc.) or hardware (register value changes, etc.). If no externally accessible operations are performed while executing the critical section, the entity eventually executes the lock-release instruction at the end of the critical section, which causes the entity to release the lock by writing a FREE value to the lock variable in the local cache for the entity (the FREE value in the lock variable in the lower-level cache is left unchanged).

However, if and when an externally accessible operation is performed while executing the instructions in the critical section, the entity performs operations to acquire the lock for the critical section. More specifically, the entity updates the lock variable held in the local cache to a TAKEN_FOR_WRITING value, writes/stores a TAKEN value to the copy of the lock variable held in the lower-level cache. In these embodiments, the TAKEN_FOR_WRITING value is a numerical, bitwise, etc. value (e.g., 1, N, etc.) that is set so that the entity continues to assume that the lock is held by the entity and thus the critical section can be freely executed. In addition, the TAKEN value is a numerical, bitwise, etc. value (e.g., 1, C, etc.) that is set to indicate to entities in the computing device that the lock is held/owned by an entity in the computing device. By setting the TAKEN value for the copy of the lock variable in the lower-level cache as described, the entity indicates to other entities in the computing device the fact that the entity is executing the critical section (i.e., has acquired the lock for the critical section). The entity then maintains the TAKEN_FOR_WRITING value in the lock variable held in the local cache and the TAKEN value in the copy of the lock variable held in the lower-level cache for the duration of the execution of the critical section (i.e., maintains the entity's hold on the lock for the critical section). Eventually, the entity executes the lock-release instruction at the end of the critical section, which causes the entity to release the lock by updating the lock variable held in the local cache to the FREE value and writes/stores the FREE value to the copy of the lock variable held in the lower-level cache.

As described above, when the copy of the lock variable is held in the lower-level cache with the FREE value, the lock variable is free/available and other entities in the computing device are permitted to simultaneously hold copies of the cache block in their local caches with the TAKEN_FOR_READING value. However, when the copy of the lock variable is held in the lower-level cache with the TAKEN value, the lock is owned/held by the entity and so no other entities in the computing device are permitted to simultaneously hold valid copies of the cache block in their local caches.

In the described embodiments, because entities initially leave the copy of the lock variable with the FREE value (despite the lock variable being in the local cache to the TAKEN_FOR_READING value) upon entering a critical section, multiple entities in the computing device may simultaneously hold copies of the cache block for the lock variable with the TAKEN_FOR_READING value. This enables multiple entities to concurrently execute critical sections protected by the same lock. As long as none of the entities encounters an externally accessible operation and sets the copy of the lock variable in the lower-level cache to the TAKEN value, all of the entities are allowed to complete the concurrent execution of corresponding critical sections. However, if and when an entity writes the TAKEN value to the copy of the lock variable in the lower-level cache before performing an externally accessible operation, any other copies of the cache block for the lock variable in local caches for other entities are invalidated. When a copy of the cache block for the lock variable is invalidated in the local cache for an entity, the entity aborts the execution of the instructions in the corresponding critical section and performs a remedial action (e.g., executing error-handling code, restoring a pre-lock-section state of the entity and attempting to execute the critical section again, etc.). By aborting execution of the other critical sections as described, these embodiments avoid multiple entities performing externally accessible and possibly conflicting operations, thereby maintaining the appearance that the critical sections were not executed concurrently and avoiding possible errors.

As described, before performing an externally accessible operation while executing a critical section, an entity updates the lock variable held in the local cache and the copy of the lock variable in the lower-level cache. However, in some embodiments, when performing a locally-accessible operation, the entity does not update the lock variable held in the local cache or the copy of the lock variable in the lower-level cache (i.e., leaves the lock variable held in the local cache with the TAKEN_FOR_READING value and leaves the FREE value in the copy of the lock variable held in the lower-level cache). For example, in some embodiments, the entity does not update the lock variable held in the local cache or the copy of the lock variable in the lower-level cache when performing operations with only a local effect that are not accessible to other entities on the computing device such as writes to a local stack, when making local state changes, etc. In some embodiments, "local effects" are effects that can be ignored or reversed if and when an entity restores a pre-lock-section state of the entity.

In some embodiments, before writing the TAKEN_FOR_READING value to the lock variable held in the local cache, the entity verifies that the copy of the lock variable in the lower-level cache does not already hold the TAKEN value, i.e., that no other entity in the computing device presently holds the lock. If the copy of the lock variable in the lower-level cache does not hold the TAKEN value (i.e., holds the FREE value), the entity writes the TAKEN_FOR_READING value to the lock variable held in the local cache as described above. Otherwise, the entity performs a remedial action. For example, the entity may delay executing a corresponding critical section (and hence may later recheck the copy of the lock variable in the lower-level cache), may execute error-handling code, etc.

In some embodiments, before a given entity updates the lock variable held in the local cache and the copy of the lock variable in the lower-level cache upon encountering an externally accessible operation when executing instructions in a corresponding critical section, the given entity determines if any other entities in the computing device hold a copy of the cache block with the lock variable in their local cache with the TAKEN_FOR_READING value (e.g., using a coherency mechanism/messages, a counter associated with the cache block, etc.). If so, in some embodiments, the given entity waits until no other entities hold a copy of the cache block for the lock variable in a local cache with the TAKEN_FOR_READING value (i.e., until these entities complete execution of a corresponding critical section and write the FREE value to the lock variable in the local cache) before updating the lock variable held in the local cache and the copy of the lock variable in the lower-level cache. In some of these embodiments, the given entity configures the computing device to prevent other entities from newly writing the TAKEN_FOR_READING value to the lock variable in their local caches (e.g., via coherency mechanisms/messages, a control value associated with the lock variable/cache block, etc.), thereby assisting with forward progress for the given entity. However, in some embodiments, upon determining that at least one other entity holds a copy of the cache block with the lock variable in a local cache with the TAKEN_FOR_READING value, the given entity does not wait for all other entities to complete corresponding critical sections before updating the lock variable held in the local cache and the copy of the lock variable in the lower-level cache upon encountering an externally accessible operation, instead, the given entity waits for a predetermined time. After the predetermined time has passed, the given entity updates the lock variable held in the local cache and the copy of the lock variable in the lower-level cache, regardless of whether other entities still hold copies of the cache block in their local caches with the TAKEN_FOR_READING value (which, as described in more detail below, causes any other entity with a valid copy of the cache block for the lock variable to invalidate the cache block).

Core

Figure 2:
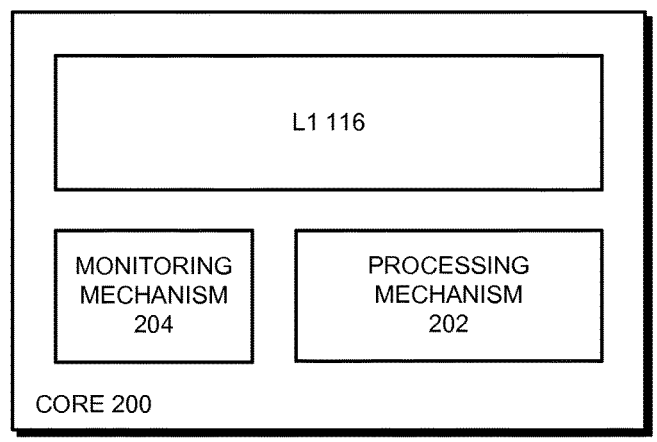
FIG. 2 presents a block diagram illustrating a core in accordance with some embodiments.

FIG. 2 presents a block diagram illustrating core 200 in accordance with some embodiments. Core 200, which is assumed to be located in a processor such as processor 102 or 104, is a general example of an internal configuration that may be (but is not required to be) implemented in any of processor cores 108-114. As can be seen in FIG. 2, core 200 includes L1 cache 116, processing mechanism 202, and monitoring mechanism 204. Processing mechanism 202 is a functional block configured to perform computational operations (e.g., executing instructions from program code) for core 200. For example, in some embodiments, processing mechanism 202 includes one or more processing pipelines for executing program code.

Monitoring mechanism 204 is a functional block that performs operations to enable concurrent execution of critical sections that are protected by the same lock variable by entities in the processor. More specifically, monitoring mechanism 204 ensures that the lock variable has the appropriate value(s) in L1 cache 116 and in L2 cache 124 (i.e., the lower-level cache) to enable concurrent execution of critical sections protected by the same lock variable in the processor.

During operation, monitoring mechanism 204 detects when a predetermined lock-acquisition instruction is to be executed by processing mechanism 202. For example, monitoring mechanism 204 can receive an indication from processing mechanism 202 that a predetermined lock-acquisition instruction is to be executed. Upon detecting that the predetermined lock-acquisition instruction is to be executed, monitoring mechanism 204 begins monitoring the activities of processing mechanism 202 and/or L1 cache 116 during the execution of the corresponding critical section.

Executing the predetermined lock-acquisition instruction causes processing mechanism 202 to attempt to write the TAKEN_FOR_READING value to the lock variable for the critical section in a corresponding cache block in L1 cache 116. As part of this operation, processing mechanism 202 attempts to verifies that the copy of the lock variable in L2 cache 124 does not hold the TAKEN value. Monitoring mechanism 204 monitors this operation. If the copy of the lock variable in L2 cache 124 holds the TAKEN value, e.g., because another entity has already written the TAKEN value to the copy of the lock variable in L2 cache 124 while acquiring the lock, monitoring mechanism 204 performs a remedial action. For example, monitoring mechanism 204 can cause processing mechanism 202 and/or L1 cache 116 to wait a predetermined time and then again determine if the lock variable in L2 cache 124 still holds the TAKEN value, can cause processing mechanism 202 to execute error-handling code, etc.

In some embodiments, monitoring mechanism 204 monitors cache coherency messages between L1 cache 116 and a cache controller and/or a directory in the processor to determine operations performed on the cache block for the lock variable in L2 cache 124 (and to make subsequent determinations as described). Generally, cache coherency messages, when available, can be used to perform any of the operations herein described. Note, however, that in some embodiments, one or more dedicated/purpose specific messages is used for performing the operations herein described.

Otherwise, if the TAKEN_FOR_READING value is written to the lock variable in the local cache, monitoring mechanism 204 begins to monitor for externally accessible operations that are to be performed by processing mechanism 202 and/or L1 cache 116 while executing instructions in the corresponding critical section (i.e., externally accessible operations that are caused by the execution of the instructions in the critical section). In some embodiments, monitoring mechanism 204 monitors instructions as the instructions proceed to execution in processing mechanism 202 to detect instructions that are to perform externally accessible operations. For example, monitoring mechanism 204 may monitor for instructions that cause data to be stored/written to a lower-level cache or memory using the type of instruction, an address from the instruction, an address from which the instruction is retrieved, an operating mode of processing mechanism 202, and/or other properties of the instruction and/or processing mechanism 202. In some embodiments, monitoring mechanism 204 monitors processing mechanism 202 and/or L1 cache 116 to determine when these functional blocks are to perform externally accessible operations caused by instructions in the critical section. For example, monitoring mechanism 204 may detect when processing mechanism 202 and/or L1 cache 116 hold data from a critical section that is to be written to a lower-level cache or memory.

As described above, before an externally accessible operation is performed by processing mechanism 202 and/or L1 cache 116, processing mechanism 202 attempts to write the TAKEN_FOR_WRITING value to the lock variable in L1 cache 116 and to write the TAKEN value to the copy of the lock variable held in L2 cache 124. In some embodiments, the write of the TAKEN value to the copy of the lock variable held in L2 cache 124 is observed by other entities (snooped, etc.) in the processor and/or the other entities are informed via one or more messages, which causes the other entities to release the cache block for the lock variable (i.e., to invalidate copies of the cache block in local caches for the entities). If the TAKEN value cannot be written to the copy of the lock variable in L2 cache 124 (i.e., if write permission cannot be acquired for the cache block), monitoring mechanism 204 performs a remedial action. For example, monitoring mechanism 204 may cause processing mechanism 202 to abort executing instructions in the critical section (which may comprise restoring pre-lock-section state to processing mechanism 202 and re-trying executing the critical section), can cause processing mechanism 202 to execute error-handling code, etc.

As described above, in some embodiments, monitoring mechanism 204 does not update the lock variable held in the local cache (i.e., from the TAKEN_FOR_READING value to the TAKEN_FOR_WRITING value) and the copy of the lock variable in the lower-level cache (i.e., from the FREE value to the TAKEN value) when processing mechanism 202 and/or L1 cache 116 performs a locally-accessible operation, i.e., operations with only a local effect that are not accessible to other entities on the processor such as writes to a local stack, local processor state changes, etc. In some embodiments, "local effects" include any effect that can be ignored or reversed in the event that processing mechanism 202 is to restore a pre-lock-section state when aborting execution of instructions in the critical section.

In some embodiments, while processing mechanism 202 executes instructions from the critical section with the lock variable in the local cache holding the TAKEN_FOR_READING value, monitoring mechanism 204 monitors for write requests from other entities that are directed to the copy of the lock variable in the lower-level cache (e.g., snoops a cache request bus for such write requests) and/or invalidation messages for the cache block for the lock variable. Such write requests may be observed and/or invalidation messages may be received when a monitoring mechanism in another entity in the processor is acquiring write permission for the cache block that holds the copy of the lock variable in a lower-level cache. When such a write request is observed and/or an invalidation message is received, monitoring mechanism 204 causes processing mechanism 202 to abort the execution of instructions in the critical section and perform a remedial action. For example, monitoring mechanism 204 can cause processing mechanism 202 to restore pre-lock-section state to processing mechanism 202 and re-try executing the critical section, can cause processing mechanism 202 to execute error-handling code, etc.

In some embodiments, monitoring mechanism 204 is configured to conceal from processing mechanism 202 that the cache block that holds the copy of the lock variable in the lower-level cache is initially left with the FREE value. As described above, this is achieved by writing the TAKEN_FOR_READING value to the lock variable in L1 cache 116, but leaving the value in the lock variable in the lower level cache unchanged (i.e., maintaining the value in the lock variable in the lower level cache in the FREE state). Processing mechanism 202 recognizes the TAKEN_FOR_READING value as an indication that processing mechanism 202 has acquired the lock variable for the critical section and therefore performs operations for the critical section accordingly (i.e., freely executing instructions from the critical section). Monitoring mechanism 204, as described herein, performs operations to ensure that externally accessible operations are not performed while the FREE value remains in the copy of the lock variable in the lower-level cache.

When a lock-release instruction is executed at the end of the critical section, processing mechanism 202 and/or monitoring mechanism 204 writes the FREE value to one or both of the lock variable in the local cache and the copy of the lock variable held in the lower-level cache (if this value was changed to TAKEN during the execution of the critical section). By writing the FREE value to these locations, processor 202 releases the lock before proceeding with subsequent instruction execution.

Although shown separately in core 200, in some embodiments some or all of monitoring mechanism 204 is included in one of the other functional blocks in core 200 (e.g., L1 cache 116 and/or processing mechanism 202). In addition, throughout this description, some operations are attributed generally to "entities" (i.e., they are performed by entities); monitoring mechanism 204 can be considered a portion of core 200 (the general "entity") with regard to performing the described operations.

Process for Handling Locks in Program Code

Figure 3A:
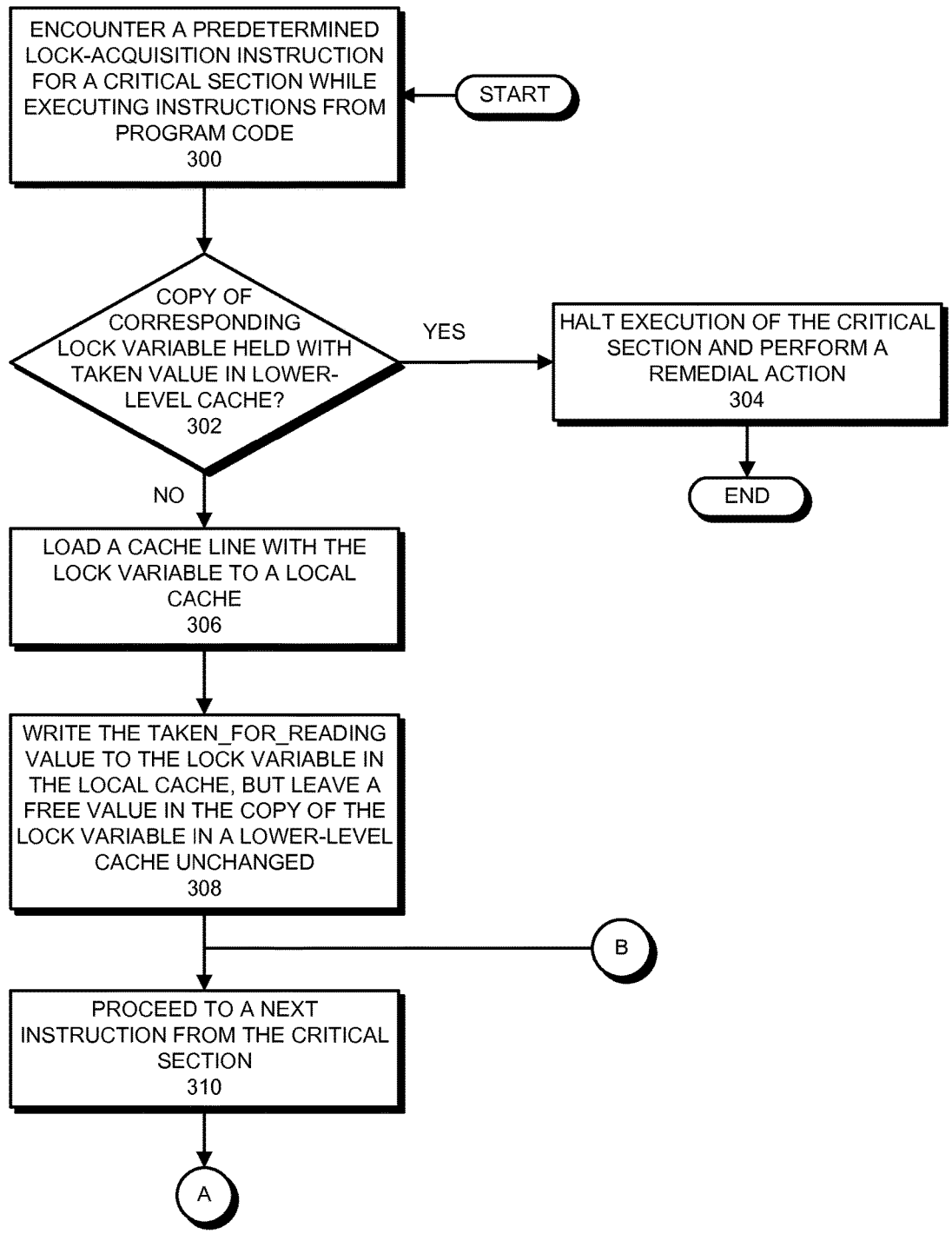
FIG. 3A presents a flowchart illustrating a process for handling critical sections in program code in accordance with some embodiments.
Figure 3B:
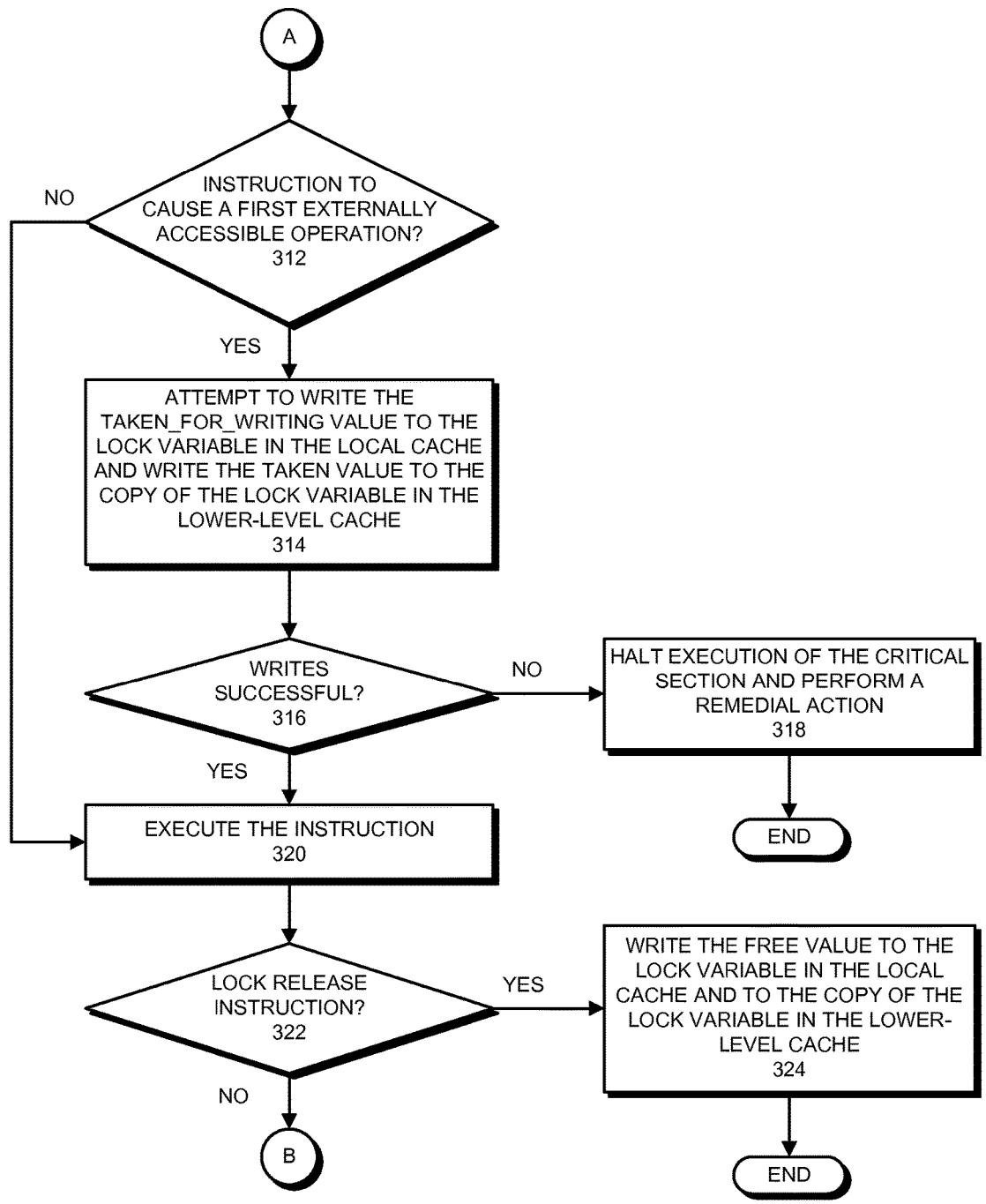
FIG. 3B presents a flowchart illustrating a process for handling critical sections in program code in accordance with some embodiments.

FIGS. 3A-3B presents a flowchart illustrating a process for handling critical sections in program code in accordance with some embodiments. More specifically, in FIGS. 3A-3B, a process is shown in which an entity in computing device 100 writes selected values to a lock variable in a local cache and/or a lower-level cache to enable the concurrent execution of critical sections that are protected by the same corresponding lock in computing device 100. In some embodiments, the entity can be any portion of computing device 100 that can perform the operations shown in FIGS. 3A-3B. For example, the entity can be any of processor cores 108-114, a thread on any of processor cores 108-114, etc. For clarity, processor core 108 is used as the entity in describing the operations in FIGS. 3A-3B.

Note that the operations shown in FIGS. 3A-3B are presented as a general example of functions performed by some embodiments. The operations performed by other embodiments include different operations and/or operations that are performed in a different order. Additionally, although certain mechanisms (entities in computing device 100, etc.) are used in describing the process, in some embodiments, other mechanisms can perform the operations.

The process shown in FIGS. 3A-3B starts when processor core 108 encounters a predetermined lock-acquisition instruction for a critical section while executing instructions from program code (step 300). In some embodiments, "encountering" the predetermined lock-acquisition instruction includes recognizing that an instruction in program code is a predetermined lock instruction while executing the program code in processor core 108. For example, the instruction may be recognized as a predetermined lock-acquisition instruction as the lock-acquisition instruction is fetched, decoded, executed, compiled/interpreted, transcoded, and/or otherwise handled in processor core 108. In some embodiments, the instruction includes one or more indicators that the instruction is a predetermined lock-acquisition instruction. For example, some embodiments include dedicated/specialized lock-acquisition instructions that can be manually or automatically included in program code by compilers, programmers, interpreters, etc. As another example, in some embodiments, lock-acquisition instructions include and/or are associated with metadata that indicates that the lock-acquisition instruction is a predetermined lock-acquisition instruction. For instance, the metadata may be included in a field (e.g., a bit flag) in a lock-acquisition instruction or included in metadata in processor core 108 associated with the lock-acquisition instruction. As yet another example, lock-acquisition instructions may be directed to (or otherwise include) particular addresses that are recognizable as being lock variables.

Processor core 108 then determines if a copy of a corresponding lock variable is held in a lower-level cache (here, L2 cache 124) with a TAKEN value (step 302). When the copy of the lock variable is held in L2 cache 124 with the TAKEN value, the lock has already been acquired by another entity in computing device 100 and therefore processor core 108 is unable to acquire the lock for the critical section (i.e., load a cache block that holds the lock variable to a local cache as described herein). (In contrast, when the copy of the lock variable is held in a lower-level cache with the FREE value, processor core 108 is permitted to acquire the lock for the critical section.) When the copy of the lock variable is held in L2 cache 124 with the TAKEN value, a monitoring mechanism (akin to monitoring mechanism 204) in processor core 108 detects the failure to acquire the lock, halts execution of the critical section, and performs a remedial action (step 304). For example, the monitoring mechanism may cause processor core 108 to delay executing a corresponding critical section and later reattempt to execute the critical section as shown in FIGS. 3A-3B, may cause processor core 108 to execute error-handling code, etc. For this example, it is assumed that the copy of the lock variable in L2 cache 124 holds the FREE value and thus processor core 108 is able to load the cache block with the lock variable to L1 cache 116 (step 306).

Processor core 108 then writes the TAKEN_FOR_READING value to the lock variable in L1 cache 116, but leaves the FREE value in the copy of the lock variable in L2 cache 124 unchanged (step 308). As described above, writing the TAKEN_FOR_READING value to the lock variable in L1 cache 116 enables processor core 108 to execute the instructions in the critical section. In addition, leaving the FREE value in the copy of the lock variable in L2 cache 124, enables other entities in computing device 100 to hold copies of the cache block for the lock variable with the value TAKEN_FOR_READING in local caches. These other entities can therefore concurrently execute critical sections protected by the same lock.

Processor core 108 then proceeds to a next instruction from the critical section (step 310). The monitoring mechanism in processor core 108 determines if the instruction will cause a first externally accessible operation (step 312). Recall that, as described above, an "externally accessible" operation comprises any operation for which a result is accessible to at least one other entity on the processor that may be concurrently executing a critical section protected by the same lock. Thus, the monitoring mechanism in processor core 108 determines if such an operation is performed by and/or as an effect of the next instruction in the critical section. Note that the "first" externally accessible operation is the first externally accessible operation in the critical section—the attempt to write the values described below need not happen for subsequent externally accessible operations in the critical section. If the instruction does not cause an externally accessible operation, the monitoring mechanism in processor core 108 permits processor core 108 to execute the instruction (step 320).

Otherwise, if the instruction is to cause the first externally accessible operation (step 312), the monitoring mechanism in processor core 108 causes processor core 108 to attempt to write the TAKEN_FOR_WRITING value to the lock variable in the corresponding cache block in L1 cache 116 and to write the TAKEN value to the copy of the lock variable in L2 cache 124 (step 314). If either of the writes are unsuccessful (e.g., because the write of the TAKEN value to the copy of the lock variable in L2 cache 124 fails due to conflict, eviction, etc.) (step 316), the monitoring mechanism causes processor core 108 to halt execution of the critical section and perform a remedial action (step 318). For example, processor core 108 may recover a saved pre-critical-section architectural state for processor core 108 and restart execution of the critical section (perhaps by automatically acquiring the lock and executing the critical section with the lock acquired), may execute error-handling code, etc.

Note that, as described above, the TAKEN_FOR_READING, TAKEN_FOR_WRITING, FREE, and TAKEN values are set to corresponding numerical values, bit patterns, strings, etc. to indicate a corresponding meaning. For example, in some embodiments, the copy of the lock variable in the L1 cache 116 may hold the FREE value (0, AAA, etc.) when the lock is not held by processor core 108, may hold the TAKEN_FOR_READING value (1, XYZ, etc.) when the lock is held and no externally accessible operations caused by instructions from the critical section have occurred or are known to be impending, and may hold the TAKEN_FOR_WRITING value (1, 2, PDQ, etc.) when the lock is held and an externally accessible operation caused by an instruction from the critical section has occurred or is known to be impending. In some embodiments, software (applications, an operating system, etc.) can use the TAKEN_FOR_READING and TAKEN_FOR_WRITING values (i.e., different values) to determine how to handle corresponding operations. In some embodiments, the TAKEN_FOR_READING and TAKEN_FOR_WRITING values are equal (e.g., are the same non-zero value, whereas the FREE value is zero, etc.).

In some embodiments, one or more hardware and/or software entities (cores, threads, operating systems, configuration routines, and/or applications executed by computing device 100) alone or in combination can perform operations for setting one or more of the TAKEN_FOR_READING, TAKEN_FOR_WRITING, FREE, and TAKEN values. For example, in some embodiments, an operating system can set and/or update one or more of the TAKEN_FOR_READING, TAKEN_FOR_WRITING, FREE, and TAKEN to enable various corresponding operations. In these embodiments, the one or more of the TAKEN_FOR_READING, TAKEN_FOR_WRITING, FREE, and TAKEN may be set by executing a corresponding sequence of instructions (e.g., as part of a routine within the operating system).

As described above, in order to write the TAKEN value to the copy of the lock variable held in L2 cache 124, processor core 108 first acquires write permission for the cache block with the lock variable. In accordance with a coherency protocol, each other entity that holds a copy of the cache block in a corresponding local cache notices the request for write permission (snoops a request bus for, etc.) and/or receives an invalidation request for the cache block (e.g., from L2 cache 124 or another mechanism) and performs operations to invalidate local copies of the cache block, thereby preparing the cache block for writing by processor core 108. In some cases, the other entities may be executing instructions in a corresponding critical section and may halt the execution of the instructions in the critical section upon invalidating the cache block with the lock variable. This operation is described in more detail with respect to FIGS. 4A-4B.

On the other hand, if the writes are successful (step 316), processor core 108 proceeds with executing the instruction (step 320). In this way, the lock variable is configured in L1 cache 116 and L2 cache 124 to enable processor core 108 to perform the externally accessible operation without possibly erroneously altering the architectural state in computing device 100. This is true because no other entities in computing device 100 should be executing critical sections that are protected by the same lock following the write of the TAKEN value to the copy of the lock variable held in L2 cache 124.

If the instruction is not a lock-release instruction at the end of the critical section (step 322), processor core 108 returns to step 310 to proceed to a next instruction from the critical section. Otherwise, if the instruction is a lock release instruction (step 322), processor core 108 (or another mechanism) writes a FREE value to the lock variable in L1 cache 116 and to the copy of the lock variable in L2 cache 124 (step 324). By writing the FREE value as described, processor core 108 frees the lock (i.e., because the copy of the lock variable in L2 cache 124 indicates, via the FREE value, that the lock is not held by any entity in computing device 100) so that another entity in computing device 100 can acquire the lock as described herein.

Figure 4A:
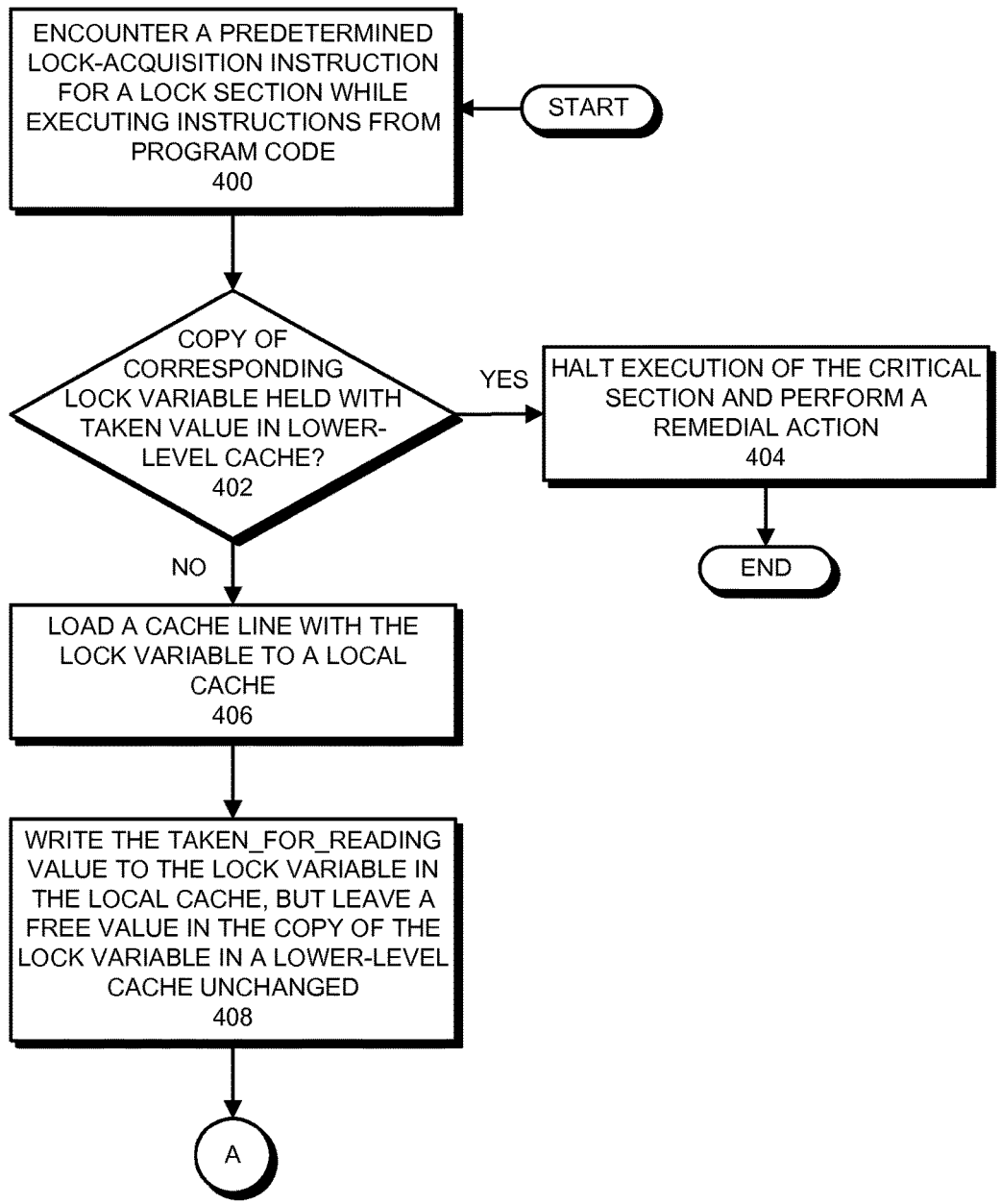
FIG. 4A presents a flowchart illustrating a process for handling critical sections in program code in accordance with some embodiments.
Figure 4B:
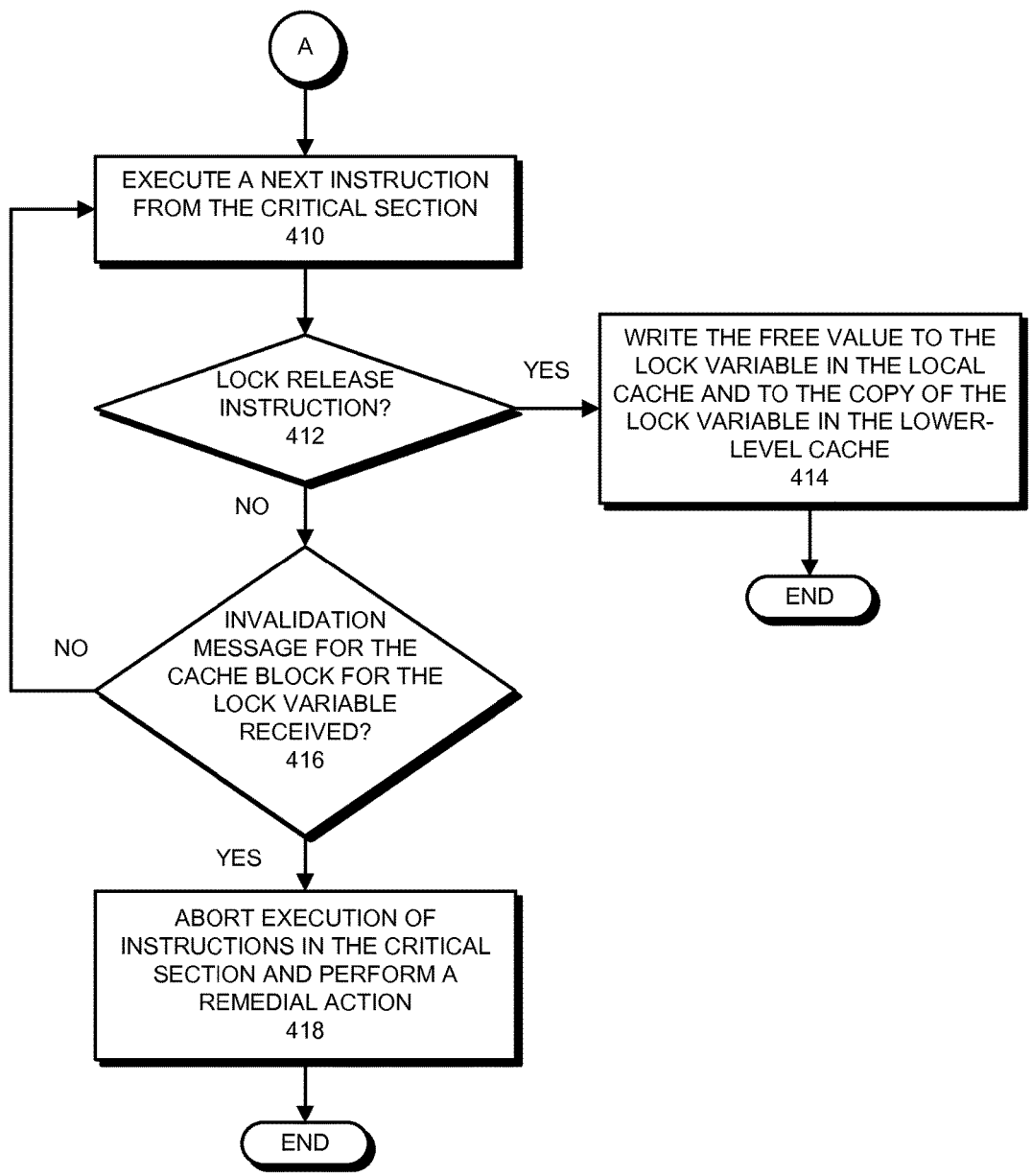
FIG. 4B presents a flowchart illustrating a process for handling critical sections in program code in accordance with some embodiments.

FIGS. 4A-4B presents a flowchart illustrating a process for handling critical sections in program code in accordance with some embodiments. More specifically, in FIGS. 4A-4B, a process is shown in which an entity in computing device 100 that has a cache block with a lock variable in a local cache handles an invalidation message for the cache block from another entity in computing device 100. In some embodiments, the entity can be any portion of computing device 100 that can perform the operations shown in FIGS. 4A-4B. For example, the entity can be any of processor cores 108-114, a thread on any of processor cores 108-114, etc. For clarity, processor core 108 is used as the entity in describing the operations in FIGS. 4A-4B.

Note that the operations shown in FIGS. 4A-4B are presented as a general example of functions performed by some embodiments. The operations performed by other embodiments include different operations and/or operations that are performed in a different order. Additionally, although certain mechanisms (entities in computing device 100, etc.) are used in describing the process, in some embodiments, other mechanisms can perform the operations. In addition, the operations shown in FIGS. 4A-4B are presented to illustrate the operations performed when the invalidation message is received and thus some of the operations shown in FIGS. 3A-3B are not shown in FIGS. 4A-4B (e.g., steps 312-318). However, in some embodiments, these operations may be also be performed.

The process shown in FIGS. 4A-4B starts when processor core 108 encounters a predetermined lock-acquisition instruction for a critical section while executing instructions from program code (step 400). Processor core 108 then determines if a copy of a corresponding lock variable is held in a lower-level cache (here, L2 cache 124) with a TAKEN value (step 402). When the copy of the lock variable is held in L2 cache 124 with the TAKEN value, a monitoring mechanism (akin to monitoring mechanism 204) in processor core 108 detects the failure to acquire the lock, halts execution of the critical section, and performs a remedial action (step 404). For this example, it is assumed that the copy of the lock variable in L2 cache 124 holds the FREE value and thus processor core 108 is able to load the cache block with the lock variable to L1 cache 116 (step 406).

Processor core 108 then writes the TAKEN_FOR_READING value to the lock variable in L1 cache 116, but leaves the FREE value in the copy of the lock variable in L2 cache 124 unchanged (step 408). As described above, writing the TAKEN_FOR_READING value to the lock variable in L1 cache 116, enables processor core 108 to execute the instructions in the critical section. In addition, leaving the FREE value in the copy of the lock variable in L2 cache 124, enables other entities in computing device 100 to hold copies of the cache block for the lock variable with the value TAKEN_FOR_READING in local caches. These other entities can therefore concurrently execute critical sections protected by the same lock.

Processor core 108 then executes a next instruction from the critical section (step 410). If the instruction is a lock release instruction at the end of the critical section (step 412), processor core 108 (or another mechanism) writes a FREE value to the lock variable in L1 cache 116 and to the copy of the lock variable in L2 cache 124 (step 414). By writing the FREE value as described, processor core 108 frees the lock (i.e., because the copy of the lock variable in L2 cache 124 indicates, via the FREE value, that the lock is not held by any entity in computing device 100) so that another entity in computing device 100 can acquire the cache block as described herein.

If the instruction is not a lock-release instruction (step 412), processor core 108 determines if an invalidation message for the cache block for the lock variable has been received (step 416). When an invalidation message for the cache block for the lock variable has been received, processor core 108 (or another mechanism) aborts the execution of instructions in the critical section and performs a remedial action (step 418). For example, processor core 108 may recover a saved pre-critical-section architectural state for processor core 108 and restart execution of the critical section (perhaps by automatically acquiring the lock and executing the critical section with the lock acquired), may execute error-handling code, etc. Otherwise, when an invalidation message for the cache block for the lock variable has not been received (step 414), processor core 108 returns to step 410 to execute a next instruction from the critical section.

Note that, in some embodiments, an "invalidation message" is not received. Instead, in these embodiments, processor core 108 (and/or another mechanism) monitors for writes from other entities to the copy of the lock variable in L2 cache 124. As described above, such a write occurs when the other entity is acquiring the lock (and thus processor core 108 will need to halt execution of the critical section protected by the same lock). Upon detecting such a write, processor core 108 aborts the execution of instructions in the critical section and performs a remedial action such as in step 418.

Nesting Critical Sections

Some embodiments support nesting for critical sections—i.e., permit instructions from a given inner critical section to be executed within an outer critical section. In these embodiments, one or more critical sections can be enclosed within one or more other critical sections. In some of these embodiments, upon writing the TAKEN value to a copy of a corresponding lock variable in a lower-level cache for a given inner critical section (before performing an externally accessible operation therein), the TAKEN value should be written to the copy of the corresponding lock variable in the lower-level cache for each enclosing critical section (i.e., each outer critical section in which the given inner critical section is enclosed). In some of these embodiments, newly opened critical sections inside the given inner critical section, as long as no externally accessible operations are performed by the newly opened critical sections, need not write the TAKEN value to a copy of a corresponding lock variable in the lower-level cache. However, in some embodiments, when writing the TAKEN value to a copy of a corresponding lock variable in a lower-level cache for a given inner critical section, the TAKEN value need not be written to a copy of a corresponding lock variable in a lower-level cache for any outer/enclosing critical sections. In these embodiments, the inner critical section should be aborted if an outer critical sections is aborted.

Context Switching

In order to detect when an entity in computing device 100 has requested write permission (in preparation for writing the TAKEN value to a copy of a lock variable in a lower-level cache), a given thread executing on a core (where the thread is an entity) should not be context-switched/preempted out of active execution (i.e., the thread should remain scheduled on the core). In some embodiments, in order to handle thread scheduling/preemptions, when a thread is preempted, the thread aborts execution of instructions in the critical section and performs a remedial action. For example, for the remedial action, the thread can acquire the lock (i.e., write the TAKEN value to the copy of the lock variable in a lower-level cache), restore pre-lock-section state and subsequently re-try executing the critical section, can execute error-handling code, etc.

Locks in Tree/List Traversal

In some embodiments, linked list or tree traversal can be performed using the above-described technique for handling critical sections. In these embodiments, each element of the linked list or tree is protected by a corresponding lock, which may be called "fine-grain locking." As each element of linked lists or trees is traversed, the TAKEN_FOR_READING value is written to the lock variable for the corresponding lock in the local cache, but the FREE value is left in the copy of the lock variable in the lower-level cache(s). However, the TAKEN value is written to the copy of the lock variable in the lower-level cache for a final target element that is to be modified. Thus, multiple concurrent readers can traverse the data-structure and only concurrent readers on the final target element are aborted.

In some embodiments, a computing device (e.g., computing device 100 in FIG. 1) uses code and/or data stored on a computer-readable storage medium to perform some or all of the operations herein described. More specifically, the computing device reads the code and/or data from the computer-readable storage medium and executes the code and/or uses the data when performing the described operations.

A computer-readable storage medium can be any device or medium or combination thereof that stores code and/or data for use by a computing device. For example, the computer-readable storage medium can include, but is not limited to, volatile memory or non-volatile memory, including flash memory, random access memory (eDRAM, RAM, SRAM, DRAM, DDR, DDR2/DDR3/DDR4 SDRAM, etc.), read-only memory (ROM), and/or magnetic or optical storage mediums (e.g., disk drives, magnetic tape, CDs, DVDs). In the described embodiments, the computer-readable storage medium does not include non-statutory computer-readable storage mediums such as transitory signals.

In some embodiments, one or more hardware modules are configured to perform the operations herein described. For example, the hardware modules can comprise, but are not limited to, one or more processors/processor cores/central processing units (CPUs), application-specific integrated circuit (ASIC) chips, field-programmable gate arrays (FPGAs), caches/cache controllers, embedded processors, graphics processors (GPUs)/graphics processor cores, pipelines, Accelerated Processing Units (APUs), and/or other programmable-logic devices. When such hardware modules are activated, the hardware modules perform some or all of the operations. In some embodiments, the hardware modules include one or more general-purpose circuits that are configured by executing instructions (program code, firmware, etc.) to perform the operations.

In some embodiments, a data structure representative of some or all of the structures and mechanisms described herein (e.g., computing device 100 and/or some portion thereof) is stored on a computer-readable storage medium that includes a database or other data structure which can be read by a computing device and used, directly or indirectly, to fabricate hardware comprising the structures and mechanisms. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates/circuit elements from a synthesis library that represent the functionality of the hardware comprising the above-described structures and mechanisms. The netlist may then be placed and routed to produce a data set describing geometric shapes to be applied to masks. The masks may then be used in various semiconductor fabrication steps to produce a semiconductor circuit or circuits corresponding to the above-described structures and mechanisms. Alternatively, the database on the computer accessible storage medium may be the netlist (with or without the synthesis library) or the data set, as desired, or Graphic Data System (GDS) II data.

In this description, functional blocks may be referred to in describing some embodiments. Generally, functional blocks include one or more interrelated circuits that perform the described operations. In some embodiments, the circuits in a functional block include circuits that execute program code (e.g., machine code, firmware, etc.) to perform the described operations.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A method for handling critical sections in program code, comprising:
in an entity in a processor, performing operations for:
upon executing a predetermined lock-acquisition instruction at the start of a critical section in program code, writing a first value to a lock variable for a corresponding lock in a local cache, but leaving unchanged a second value in the lock variable in one or more lower levels of a memory hierarchy, wherein the lock variable in the local cache and the lock variable in the one or more lower levels of the memory hierarchy are copies of a same lock variable; and
while subsequently executing program code in the critical section:
before performing an operation for which a result is externally accessible, writing a third value to the lock variable in the local cache and writing a fourth value to the lock variable in the one or more lower levels of the memory hierarchy, wherein a result is externally accessible when the result is accessible to at least one other entity on the computing device that may be concurrently executing a critical section protected by the lock, and wherein the first, second, third, and fourth values each indicate a different property for a corresponding lock variable.

2. The method of claim 1, further comprising, while executing program code in the critical section:

when performing an operation for which a result is not externally accessible, leaving unchanged the first value in the lock variable in the local cache and the second value in the lock variable in the one or more lower levels of the memory hierarchy.

3. The method of claim 1, further comprising:
determining that the lock variable for the lock in the one or more lower levels of the memory hierarchy contains the fourth value,
not executing program code in the critical section; and
performing a remedial action.

4. The method of claim 3, wherein performing the remedial action comprises:
executing error-handling code; or
waiting for a delay period and then attempting to execute program code in the critical section.

5. The method of claim 1, further comprising, before writing the fourth value to the lock variable in the one or more lower levels of the memory hierarchy:
invalidating any copies of the cache block that include a corresponding lock variable in local caches for other entities in the processor.

6. The method of claim 1, further comprising:
when one or more other entities in the processor have the first value in a corresponding lock variable in a corresponding local cache, before writing the third value to the lock variable in the local cache and writing the fourth value to the lock variable in the one or more lower levels of the memory hierarchy, waiting until no other entities in the processor have the first value in the corresponding lock variable in the corresponding local cache.

7. The method of claim 6, wherein waiting until no other entities in the processor have the first value in the corresponding lock variable in the corresponding local cache comprises:
while waiting, preventing other entities in the processor from newly writing the first value to the corresponding lock variable in the corresponding local cache.

8. The method of claim 1, further comprising:
when one or more other entities in the processor have the first value in a corresponding lock variable for the lock in a corresponding local cache, waiting a predetermined time before writing the third value to the lock variable in the local cache and writing the fourth value to the lock variable in the one or more lower levels of the memory hierarchy.

9. The method of claim 1, further comprising, when another entity in the processor writes a fourth value to the lock variable in the one or more lower levels of the memory hierarchy when the entity in the processor is executing program code in the critical section without having written a fourth value to the lock variable in the one or more lower levels of the memory hierarchy:
invalidating the cache block that includes the lock variable in the local cache;
aborting executing program code in the critical section; and
performing a remedial action.

10. The method of claim 9, wherein performing the remedial action comprises:
restoring previously stored state information that facilitates returning the entity in the processor to a start of the critical section; and
returning the entity in the processor to the start of the critical section.

11. The method of claim 1, further comprising:
upon executing a lock-release instruction at the end of the critical section in program code, writing the second value to the lock variable in the local cache and in the one or more lower levels of the memory hierarchy.

12. The method of claim 1, further comprising:
before writing the third value to the lock variable in the local cache and writing the fourth value to the lock variable in the one or more lower levels of the memory hierarchy, determining that the lock variable in the one or more lower levels of the memory hierarchy has the second value; and
when the lock variable in the one or more lower levels of the memory hierarchy does not have the second value, aborting executing program code in the critical section and performing a remedial action.

13. A processor that handles critical sections in program code, comprising:
an entity that performs operations for:
upon executing a predetermined lock-acquisition instruction at the start of a critical section in program code, writing a first value to a lock variable for a corresponding lock in the local cache, but leaving unchanged a second value in the lock variable in one or more lower levels of a memory hierarchy, wherein the lock variable in the local cache and the lock variable in the one or more lower levels of the memory hierarchy are copies of a same lock variable; and
while subsequently executing program code in the critical section:
before performing an operation for which a result is externally accessible, writing a third value to the lock variable in the local cache and writing a fourth value to the lock variable in the one or more lower levels of the memory hierarchy, wherein a result is externally accessible when the result is accessible to at least one other entity on the computing device that may be concurrently executing a critical section protected by the lock, and wherein the first, second, third, and fourth values each indicate a different property for a corresponding lock variable.

14. The processor of claim 13, wherein, while executing program code in the critical section, when performing an operation for which a result is not externally accessible, the entity leaves unchanged the first value in the lock variable in the local cache and the second value in the lock variable in the one or more lower levels of the memory hierarchy.

15. The processor of claim 13, wherein the entity performs operations for:
determining that the lock variable for the lock in the one or more lower levels of the memory hierarchy contains the fourth value,
not executing program code in the critical section; and
performing a remedial action.

16. The processor of claim 15, wherein performing the remedial action comprises:
executing error-handling code; or
waiting for a delay period and then attempting to execute program code in the critical section.

17. The processor of claim 13, wherein the entity performs operations for, before writing the fourth value to the lock variable in the one or more lower levels of the memory hierarchy:

invalidating any copies of the cache block that include a corresponding lock variable in local caches for other entities in the processor.

18. The processor of claim 13, wherein the entity performs operations for:
when one or more other entities in the processor have the first value in a corresponding lock variable in a corresponding local cache, before writing the third value to the lock variable in the local cache and writing the fourth value to the lock variable in the one or more lower levels of the memory hierarchy, one of:
waiting until no other entities in the processor have the first value in the corresponding lock variable in the corresponding local cache; or
waiting a predetermined time before writing the third value to the lock variable in the local cache and writing the fourth value to the lock variable in the one or more lower levels of the memory hierarchy.

19. The processor of claim 13, wherein the entity performs operations for, when another entity in the processor writes a fourth value to the lock variable in the one or more lower levels of the memory hierarchy when the entity is executing program code in the critical section without having written a fourth value to the lock variable in the one or more lower levels of the memory hierarchy,
invalidating the cache block that includes the lock variable in the local cache;
aborting executing program code in the critical section; and
performing a remedial action.

20. The processor of claim 19, wherein performing the remedial action comprises:
restoring previously stored state information that facilitates returning the entity to a start of the critical section; and
returning the entity to the start of the critical section.

21. The processor of claim 13, wherein the entity performs operations for:
upon executing a lock-release instruction at the end of the critical section in program code, writing a second value to the lock variable in the local cache and in the one or more lower levels of the memory hierarchy.

22. The processor of claim 13, wherein the entity performs operations for:
before writing the third value to the lock variable in the local cache and writing the fourth value to the lock variable in the one or more lower levels of the memory hierarchy, determining that the lock variable in the one or more lower levels of the memory hierarchy has the second value; and
when the lock variable in the one or more lower levels of the memory hierarchy does not have the second value, aborting executing program code in the critical section and performing a remedial action.

* * * * *